United States Patent [19]
Everhart et al.

[11] Patent Number: 5,603,830
[45] Date of Patent: Feb. 18, 1997

[54] CAFFEINE ADSORBENT LIQUID FILTER WITH INTEGRATED ADSORBENT

[75] Inventors: Dennis S. Everhart, Alpharetta; Rosann M. Kaylor, Cumming; Kenneth R. Smith, Atlanta, all of Ga.

[73] Assignee: Kimberly-Clark Corporation, Neenah, Wis.

[21] Appl. No.: 448,801

[22] Filed: May 24, 1995

[51] Int. Cl.$^6$ .................................................. B01D 39/00
[52] U.S. Cl. ........................... 210/502.1; 210/500.1; 210/505; 210/506; 210/346; 210/486; 210/490; 426/422; 426/427
[58] Field of Search .......................... 210/502.1, 500.1, 210/506, 507, 508, 509, 346, 486, 490, 505; 428/314.1, 98; 426/594, 597, 422, 423, 427; 99/301, 306

[56] References Cited

U.S. PATENT DOCUMENTS

| | | | |
|---|---|---|---|
| 2,375,550 | 8/1945 | Grossman | 99/59 |
| 2,391,981 | 1/1946 | Kremers . | |
| 2,416,484 | 2/1947 | Kremers | 260/256 |
| 2,472,881 | 6/1949 | Bender | 260/256 |
| 3,108,876 | 10/1963 | Turken et al. . | |
| 3,130,007 | 4/1964 | Breck | 23/113 |
| 3,998,988 | 12/1976 | Shimomai et al. | 428/400 |
| 4,239,516 | 12/1980 | Klein | 55/389 |
| 4,324,840 | 4/1982 | Katz | 426/422 |
| 4,331,694 | 5/1982 | Izod | 426/422 |
| 4,528,200 | 7/1985 | Coleman . | |
| 4,810,381 | 3/1989 | Hagen et al. | 210/502.1 |
| 4,976,979 | 12/1990 | Klima et al. | 426/427 |
| 5,208,056 | 5/1993 | Fischer et al. | 426/423 |
| 5,237,948 | 8/1993 | White | 210/502.1 |
| 5,304,305 | 4/1994 | Lehrer | 210/346 |
| 5,346,566 | 9/1994 | White | 210/502.1 |
| 5,389,166 | 2/1995 | White | 210/502.1 |
| 5,401,446 | 3/1995 | Tsai et al. . | |
| 5,468,536 | 11/1995 | Whitcomb et al. | 210/502.1 |

FOREIGN PATENT DOCUMENTS

| | | | |
|---|---|---|---|
| 553758 | 6/1932 | Germany . | |
| 2713963 | 10/1978 | Germany . | |
| 4344805 | 7/1994 | Germany . | |
| 1409200 | 7/1988 | U.S.S.R. | 426/423 |
| 1488340 | 10/1977 | United Kingdom . | |
| 93/06924 | 4/1993 | WIPO . | |

*Primary Examiner*—Ana Fortuna
*Attorney, Agent, or Firm*—Karl V. Sidor

[57] ABSTRACT

An adsorbent filter for removing caffeine from liquids. The filter is composed of a matrix of fibrous material; and adsorbent particulate material integrated within the matrix of fibrous material, so that passage of a liquid having a caffeine concentration ranging from about 20 to about 100 mg per 100 mL of liquid through the matrix for a contact time of less than about 2 minutes results in at least a 40 percent reduction in the caffeine concentration of the liquid. The matrix of fibrous material may be selected from woven fabrics, knit fabrics and nonwoven fabrics. The adsorbent material may be clay minerals such as, for example, smectite clay minerals. Examples of smectite clay minerals include, bentonite clays and montmorillonite clays. Generally speaking, the filter can be adapted to provide at least a 40 percent reduction in the caffeine concentration for about 1 cup to about 40 cups of a liquid.

22 Claims, 3 Drawing Sheets

CAFFEINE ADSORBENT LIQUID FILTER WITH INTEGRATED ADSORBENT

FIELD OF THE INVENTION

The present invention relates to an adsorbent filter system for liquids. More particularly, the present invention relates to sheet or web materials that incorporate materials useful for adsorption.

BACKGROUND OF THE INVENTION

Conventional industrial processes to decaffeinate liquids such as, for example, coffee include: 1) solvent decaffeination, where a solvent such as ethyl acetate is used to extract caffeine from pre-wetted starting material such as, for example, green coffee beans; 2) super-critical carbon dioxide, which uses an inert gas (carbon dioxide) to act as a solvent and remove caffeine from starting material such as, for example, green coffee beans; and 3) water decaffeination, which uses an aqueous extract (e.g., aqueous coffee extract containing equilibrium quantities of the non-caffeine soluble solids but no caffeine) to extract essentially only caffeine from a starting material such as, for example, green coffee beans.

The use of clays, zeolites, activated carbon, or ion-exchange resins as decaffeination aids or processes has been reported in the literature, although these materials are not in wide-scale industrial use. Generally speaking, such materials are used to decaffeinate only caffeine-containing liquids. The removed caffeine cannot be easily recovered once it has adsorbed/absorbed onto clays, zeolites, activated carbon, or ion-exchange resins. In contrast, most conventional industrial decaffeination processes decaffeinate solid starting materials such as, for example, coffee beans. Such conventional industrial processes are generally designed to recover the caffeine which is sold as a chemical once removed from the coffee, tea, cola or other source.

In some decaffeination processes, bentonite clay is mixed with a liquid such as, for example, brewed coffee for about 45 minutes. The bentonite clay is removed by either settling/ decanting, filtering, or centrifuging the slurry. Although a large proportion of the caffeine may be removed using this technique, separation of the bentonite clay from the liquid poses problems. A consumer would not wish to wait 45 minutes before having decaffeinated beverages (e.g., decaffeinated coffee), and would not have available centrifugation or the high-pressure filtration required to remove the bentonite.

Accordingly, there is a need for a practical device which uses an adsorbent to remove caffeine from liquids. For example, there is a need for a filter that incorporates clays or zeolites to adsorb caffeine from liquids in order to produce a practical consumer product. A need exists for a filter containing an adsorbent such as, for example, bentonite clays and/or zeolites which could be used in a similar manner as a conventional coffee filter (either basket- or cone-type) to decaffeinate up to an entire pot of coffee or tea as the beverage brewed. A need also exists for a filter containing an adsorbent such as, for example, bentonite clays and/or zeolites which could be used to decaffeinate individual cups of liquid such as, for example, coffee, tea or cola.

There is also a need for a filter that is adapted to decaffeinate liquids within 1 or 2 minutes. A need also exists for a filter that is adapted to decaffeinate liquids cleanly without adsorbent particles passing into the liquid/filtrate and without the need for high pressure differentials. There is also a need for a filter that is adapted to successfully decaffeinate liquids at a wide range of temperatures.

DEFINITIONS

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and bonded carded web processes.

As used herein, the term "spunbond web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 micrometers (µm), for example, having a diameter of from about 0.5 micrometers to about 50 micrometers, more specifically microfibers may also have an average diameter of from about 1 micron to about 20 micrometers. Microfibers having an average diameter of about 3 micrometers or less are commonly referred to as ultra-fine microfibers. A description of an exemplary process of making ultra-fine microfibers may be found in, for example, U.S. Pat. No. 5,213,881 entitled "Nonwoven Web With Improved Barrier Properties" and U.S. Pat. No. 5,271,883, entitled "Method of Making Nonwoven Web With Improved Barrier Properties", both incorporated herein by reference in their entirety.

As used herein, the term "thermoplastic material" refers to a high polymer that softens when exposed to heat and returns to its hardened (i.e., pre-softened) state when cooled to room temperature. Natural substances which exhibit this behavior include some crude rubbers and a number of waxes. Other exemplary thermoplastic materials include, without limitation, polyvinyl chloride, polyesters, nylons, polyfluorocarbons, polyethylene, polyurethane, polystyrene, polypropylene, polyvinyl alcohol, caprolactams, and cellulosic and acrylic resins.

The term "pulp" as used herein refers to cellulosic fibers from natural sources such as woody and non-woody plants. Woody plants include, for example, deciduous and coniferous trees. Non-woody plants include, for example, cotton, flax, esparto grass, sisal, abaca, milkweed, straw, jute, hemp, and bagasse.

As used herein, the term "autogenous bonding" refers to bonding between discrete parts and/or surfaces produced independently of external additives such as adhesives, solders, solvents, mechanical fasteners and the like. Autogenous bonding between parts and/or surfaces may take place when a sufficient amount of heat is applied to one or more compatible thermoplastic materials which compose or is included in those parts and/or surfaces.

As used herein, the term "cup" is a unit of measure generally referring to a 170-mL portion of liquid.

As used herein, the terms "zeolite" and "zeolitic" refer to molecular-sieve zeolites that are crystalline aluminosilicates of group IA and Group IIA elements such as sodium, potassium, magnesium, and/or calcium. Molecular-sieve zeolites may be natural zeolite minerals or synthetic zeolites. Natural zeolite minerals include, but are not limited to, analcime, chabazite, clinoptilolite, erionite, faujasite, harmotome, heulandite, mordenite, natrolite, philipsite, scolecite, and stilbite. Synthetic zeolites include, but are not limited to, zeolite A, zeolite X, zeolite Y, and zeolite L. Generally speaking, zeolites are complex, crystalline inorganic polymers based on an expansive extending framework of $AlO_4$ and $SiO_4$ tetrahedra linked to each other by the sharing of oxygen ions. This framework contains channels or interconnected voids which, when empty, presents a host structure permeated by micropores that may amount to 50% of the crystals by volume.

As used herein, the term "clay minerals" refers to minerals of the smectite group (often referred to in early literature as the "montmorillonite" group). Clay minerals of the smectite group include, but are not limited to, montmorillonite, beidellite, nontronite, hectorite, saponite, and sauconite. Generally speaking, clay minerals of the smectite group are particles, grains and crystals having a layered or sheet-like structure. These clay minerals typically contain Al, Mg, Na, Si, O, and are hydrated, although other elements may be present. For example, montmorillonite has the general formula $[Al_{1.67}Mg_{0.33}(Na_{0.33})]Si_4O_{10}(OH)_2$. Cations (e.g., Na, Ca, K) may be sorbed between the layers. Clay minerals are composed of extremely fine particles, grains and crystals often having a diameter of less than about 4 micrometers. Bentonite is a clay that is rich in montmorillonite and is intended to be encompassed in the present use of the term "clay minerals".

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The present invention responds to the needs described above by providing an adsorbent filter for removing caffeine from liquids. The filter is composed of a matrix of fibrous material; and adsorbent clay minerals integrated within the matrix of fibrous material, so that passage of a liquid having a caffeine concentration ranging from about 20 to about 100 mg per 100 mL of liquid through the matrix for a contact time of less than about 2 minutes results in at least a 40 percent reduction in the caffeine concentration of the liquid.

Generally speaking, the filter can be adapted to provide at least a 40 percent reduction in the caffeine concentration for about 1 cup to about 40 cups of a liquid. For example, the filter can be adapted to provide at least a 40 percent reduction in the caffeine concentration for about 1 cup to about 20 cups of a liquid. As another example, the filter can be adapted to provide at least a 40 percent reduction in the caffeine concentration for about 1 cup to about 12 cups of a liquid. The liquid to be treated may be selected from, for example, coffee, tea, and cola.

The matrix of fibrous material may be, for example, woven fabrics, knit fabrics and nonwoven fabrics. The nonwoven fabric may be a nonwoven web selected from meltblown fibrous webs, continuous spunbonded filament webs, bonded carded fibrous webs, and wet-laid fibrous webs. The nonwoven web may include fibers selected from synthetic fibers, natural fibers and pulp. In an embodiment of the present invention, the fibrous material that makes up the matrix of fibrous material may be partly or entirely composed of a thermoplastic polymer. The thermoplastic polymer may be selected from, for example, polyolefins, polyamides and polyesters. The polyolefin may be, for example, polyethylene, polypropylene, polybutene, ethylene copolymers, propylene copolymers, and butene copolymers and blends of the same.

The fibrous material may be synthetic fibers, natural fibers and/or pulp. The adsorbent material is selected from clay minerals. Desirably, the clay minerals are smectite minerals such as, for example, montmorillonite clays. More desirably, the clay minerals are bentonite clays (i.e., clay material rich in montmorillonite). Desirably, the bentonite clays are calcium bentonite clays, acidified bentonite clays and/or modified bentonite clays containing a flocculating agent. Suitable flocculating agents include, for example, gelatin.

It is contemplated that the adsorbent material may be zeolites. The zeolites may be selected from natural zeolites and synthetic, crystalline, zeolitic sodium aluminosilicates of the molecular sieve type. For example, the zeolites may be crystalline zeolite Y and/or zeolitic aluminosilicates having a $SiO_2/Al_2O_3$ molar ratio of from 4.5 to 35 and the essential X-ray powder diffraction pattern of zeolite Y. Description of an example of a suitable zeolite may be found in, for example, U.S. Pat. No. 4,331,694 to Izod, the contents of which concerning zeolites is incorporated herein by reference. Some suitable zeolites may be characterized as being zeolitic aluminosilicates having a $SiO_2/Al_2O_3$ molar ratio of from 4.5 to 35, desirably 4.5 to 9, the essential X-ray powder diffraction pattern of zeolite Y, an ion-exchange capacity of not greater than 0.070, a unit cell dimension $a_o$ of from about 24.20 to 24.45 Angstroms, a surface area of at least 350 $m^2/gram$ (B-E-T), a sorptive capacity for water vapor at 25° C. and a $p/p_o$ value of 0.10 of less than 5.00 weight percent and a Residual Butanol Test value of no more than 0.40 weight percent.

According to one aspect of the invention, the filter may contain from about 10 to about 90 percent, by weight, adsorbent material. For example, the filter may contain from about 20 to about 70 percent, by weight, adsorbent material. Desirably, the filter may contain from about 30 to about 60 percent, by weight, adsorbent material.

In an embodiment of the invention, passage of from about 1 cup to about 12 cups of a liquid having a caffeine concentration ranging from about 20 to about 100 mg per 100 mL of liquid through the adsorbent filter for a contact time of from about 30 seconds to about 2 minutes results in at least a 40 percent reduction in the caffeine concentration of the liquid. In another embodiment of the invention, passage of from about 1 cup to about 12 cups of a liquid having a caffeine concentration ranging from about 20 to about 100 mg per 100 mL of liquid through the matrix for a contact time of from about 30 seconds to about 2 minutes results in at least a 60 percent reduction in the caffeine concentration of the liquid. In yet another embodiment of the invention, passage of from about 1 cup to about 12 cups of a liquid having a caffeine concentration ranging from about 20 to about 100 mg per 100 mL of liquid through the matrix for a contact time of from about 30 seconds to about 2 minutes results in at least an 80 percent reduction in the caffeine concentration of the liquid.

The adsorbent filter may be treated with a surfactant. For example, the filter may be treated with a food grade surfactant to promote wetting of the filter and passage of liquid through the filter. Alternatively and/or additionally, the adsorbent filter may be configured to contain hydrophilic fibers to promote wetting of the filter and passage of liquid through the filter. For example, the adsorbent filter may contain at least about 40 percent, by weight, hydrophilic fibers. As another example, the adsorbent filter may contain about 60 percent, by weight, or more hydrophilic fibers. The hydrophilic fibers may be in the form of cellulosic textile fibers, pulp and/or hydrophilically transmuted hydrophobic fibers (i.e., hydrophobic fibers rendered hydrophilic by use of internal, external wetting agents and/or surface modification).

According to the invention, the adsorbent filter may have a basis weight of from about 6 to about 400 grams per square meter.

The present invention also encompasses an adsorbent filter in the form of a multilayer material composed of at least two layers of the adsorbent filter. In yet another aspect of the present invention, the multilayer material may be composed of at least one layer of the adsorbent filter and at least one other layer. The other layer may be, for example, woven fabrics, knit fabrics, bonded carded webs, continuous spunbond filament webs, meltblown fiber webs, apertured film-like materials, and combinations thereof.

The apertured film-like material may be selected from, for example, perf-embossed films, textured apertured films, reticulated apertured films, contoured apertured films, film-nonwoven apertured laminates, and expanded plexi-filamentary films.

Yet another embodiment of the present invention encompasses an adsorbent filter for removing caffeine from liquids, in which the filter is composed of: 1) a first layer and a second layer of a liquid permeable nonwoven fibrous material adapted to autogenously bond to itself upon application of heat; 2) and from about 10 to about 90 percent, by weight, of an adsorbent particulate material sandwiched between said first and second layers of liquid permeable nonwoven fibrous material, the adsorbent particulate material selected from clays and zeolites.

DETAILED DESCRIPTION OF THE INVENTION

Figure 1:
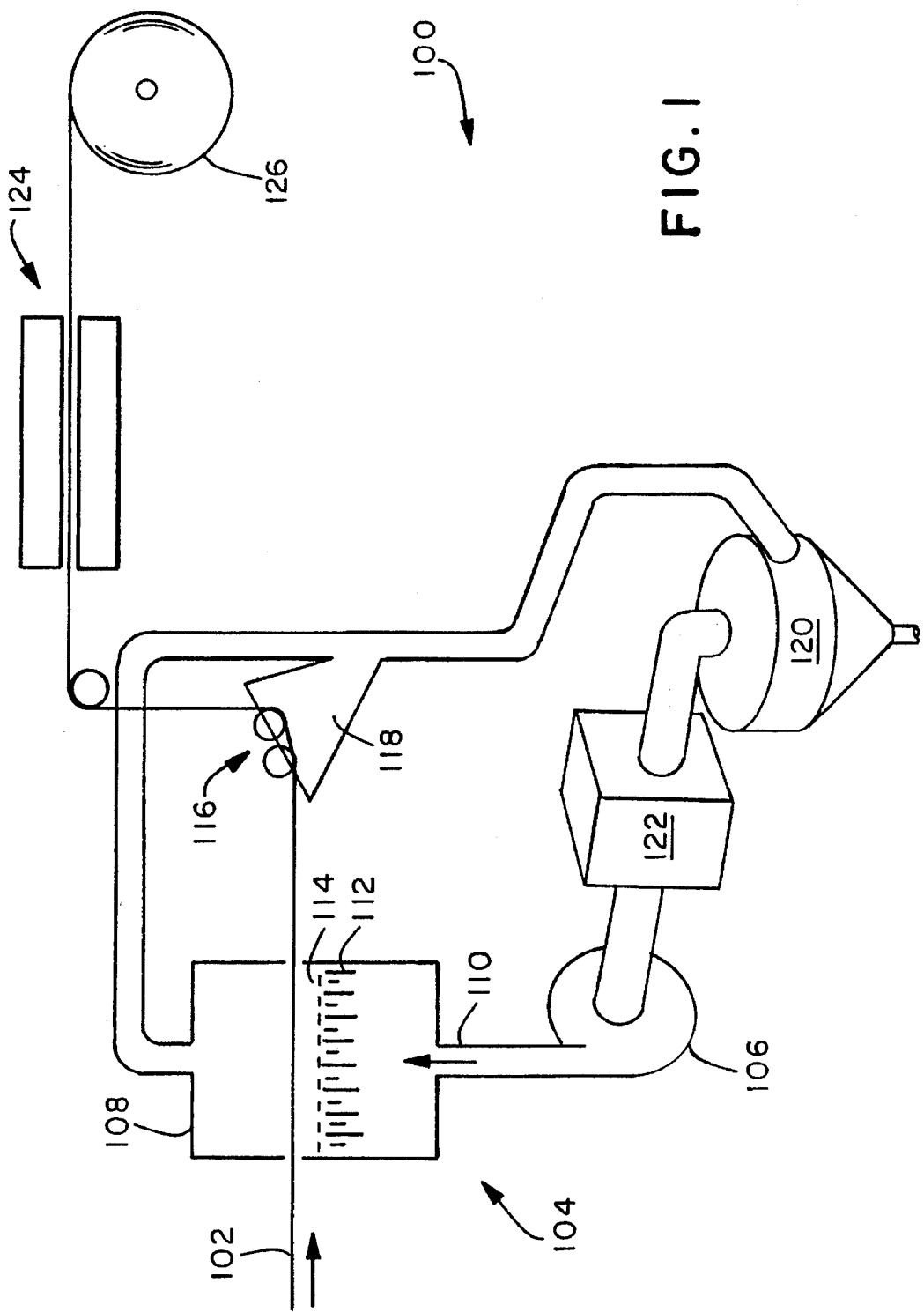
FIG. 1 is an illustration of an exemplary method for making an adsorbent filter for removing caffeine from liquids.

Referring now to FIG. 1 of the drawings, there is illustrated at 100 (not necessarily to scale) an exemplary continuous process or method for making an adsorbent filter for removing caffeine from liquids. Generally speaking, the filter is formed from a matrix of fibrous material such as, for example, a permeable sheet of fibrous material. Adsorbent particulate material is integrated within the matrix of fibrous material. The adsorbent particulate material can be integrated within the matrix of fibrous material in a variety of ways.

A permeable material 102 (e.g., a nonwoven fibrous web) is introduced into a fluidizer/coating chamber 104 and passes through the fluidizer/coating chamber 104 in the general direction of the arrows associated therewith. Generally speaking, the permeable material 102 should be permeable enough to allow a sufficient flow of gas to maintain a gas-borne suspension of particulates in the chamber (i.e., allow operation of the fluidized bed). For example, and without limitation, the permeable material may have a permeability of about 10 cfm/ft$^2$, as measured for a substantially dry sheet prior to processing. As another example, the permeable material may have a permeability of 20 to over 200 cfm/ft$^2$, as measured for a substantially dry sheet prior to processing.

In this context, the term "permeable" refers to the ability of a fluid (e.g., a gas) to pass through a matrix of fibrous material. Permeability may be expressed in terms of volume per unit of time per unit of area of the material. For example, permeability may be expressed in terms of (cubic feet per minute) per square foot of material (e.g., (ft$^3$/minute/ft$^2$) or (cfm/ft$^2$)). Permeability may be readily determined utilizing a Frazier Air Permeability Tester available from the Frazier Precision Instrument Company and measured in accordance with Federal Test Method 5450, Standard No. 191A.

According to the invention, the permeable material is a gas permeable matrix of fibrous material including, but not limited to, meltblown fibrous webs, continuous spunbonded filament webs, bonded carded fibrous webs, and wet-laid fibrous webs. The fibrous material may be synthetic fibers, natural fibers, bicomponent fibers, or continuous filaments having various deniers and lengths. Various mixtures of pulp fibers and these other types of fibers may be used. For example, the fibrous component of the adsorbent composite material may contain from about 5 to about 50 percent, by weight, staple length fibers and from about 50 to 95 percent, by weight pulp fibers.

The synthetic fibers may be made from rayon, polyester, polyamides and polyolefins such as, for example, one or more of polyethylene, polypropylene, polybutene, ethylene copolymers, propylene copolymers and butene copolymers. Natural fibers may include, for example, cotton, cotton linters, wool, silk, and flax. Typically, these fibers will have a denier in the range of about 0.7 to about 8 and an average length in the range of about 5 mm to about 36 mm. For example, the fibers may have a denier in the range of about 0.9 to about 3 and an average length in the range of about 10 mm to about 24 mm. Desirably, the fibers may have a denier in the range of about 1 to about 2 and an average length in the range of about 12 mm to about 18 mm.

Figure 2:
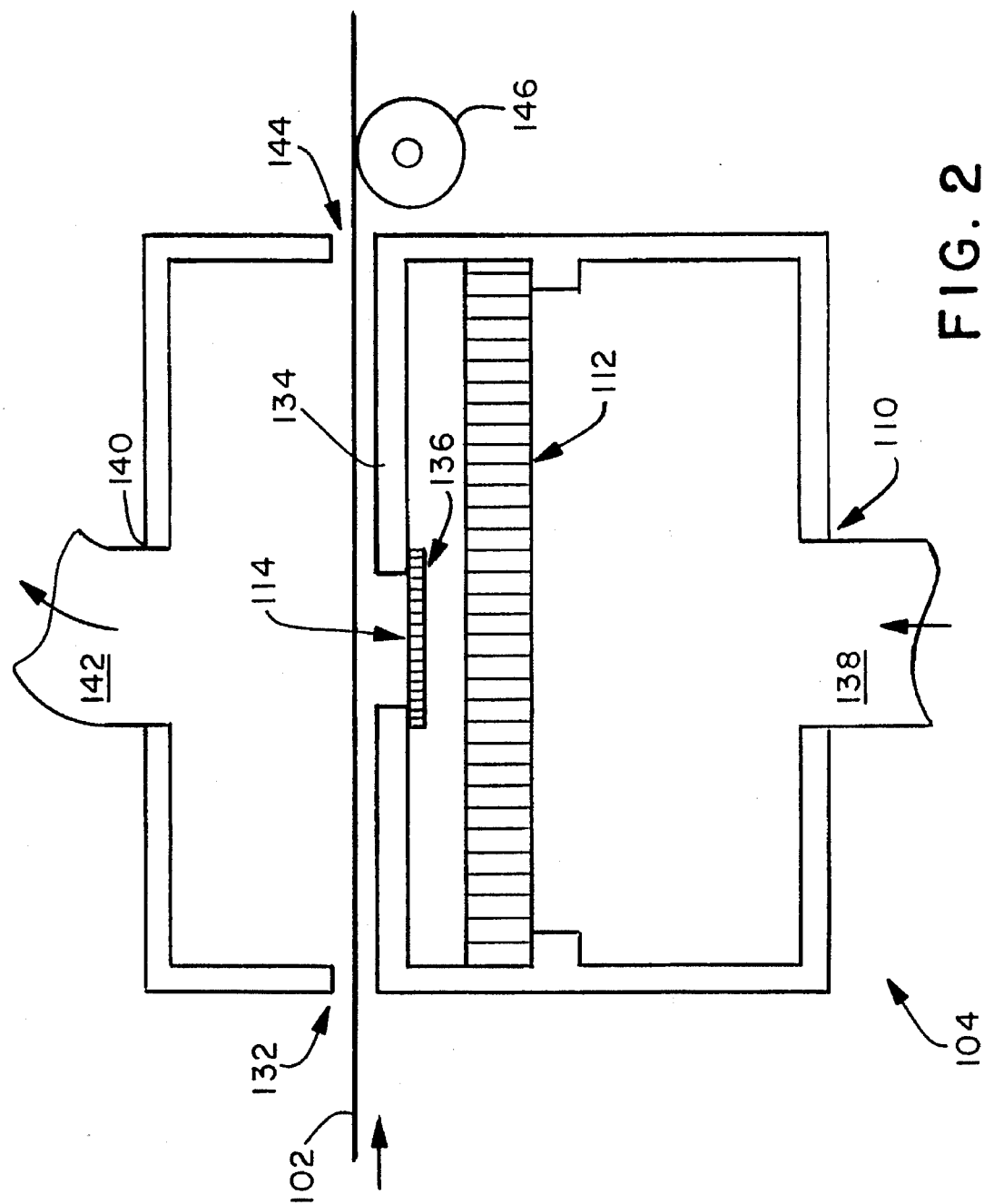
FIG. 2 is an illustration of a portion of an exemplary method for making an adsorbent filter for removing caffeine from liquids.

A ring compressor 106 provides fluidizing air to fluidizing/coating chamber 104 which includes a rectangular gas-tight housing 108, and other components shown in more detail in FIG. 2. Gas enters a gas inlet opening 110 in the general direction of the arrow associated therewith and passes through a flow straightener 112 and a fluidized bed screen 114. The system may be operated at gas flow rates and pressures readily determined by one of ordinary skill in the art. Adsorbent particulates may be continuously introduced onto the fluidized bed screen 114 using a conveyor system, pneumatic particulate handling system or the like.

Generally speaking, the adsorbent material is selected from adsorbent clay minerals. For example, the clay minerals may be smectite minerals such as, for example, montmorillonite clays. More desirably, the clay minerals are bentonite clays (i.e., clay material rich in montmorillonite). Desirably, the bentonite clays are calcium bentonite clays, acidified bentonite clays and/or modified bentonite clays containing a flocculating agent. Suitable flocculating agents include, for example, gelatin. Generally speaking, the adsorbent material may have a range of particle sizes. For example, the adsorbent materials may be of sizes characterized by the ability to pass through a screens ranging from 8 mesh to 200 mesh or even less. Some of the adsorbent material may be characterized as having average particle diameters of about 300 micrometers or less. For example, the adsorbent materials may be particles having average particle diameters of about 300 to about 75 micrometers or less. As another example, the adsorbent materials may be particles having average particle diameters ranging from about 150 micrometers to about 75 micrometers. In certain embodiments, the adsorbent materials may have much smaller average particle diameters. For example, 40 micrometers or less. As another example, the adsorbent materials may be particles having average particle diameters of about 20 to about 5 micrometers or less. As yet another example, the adsorbent materials may be particles having average particle diameters of about 5 to about 1 micrometer. In certain cases, dusting may occur when relatively small sized adsorbent material is used.

Gas flow through the fluidized bed screen 114 fluidizes the solid particulate material (not shown), and causes particulates to come into close proximity or contact with the permeable material 102. At least a portion of the particulates are integrated into the matrix of fibrous material that forms the permeable material 102.

The permeable material 102 and integrated particulates (not shown) are transported out of the fluidizing/coating chamber 104. If desired, the permeable material containing integrated particulate material may be introduced to eccentric rollers 116 which shake off excess particulate material into a catch tray 118. It should be understood that eccentric rollers are only one of many possible ways to remove excess particulate material. Excess particulate material is conveyed to a cyclone separator 120 while gas proceeds through a filter 122 to the inlet of the ring compressor 106.

Particulate material still attached to the permeable material 102 after shake-off through the eccentric rollers 116 proceeds to a heater 124 where the heat radiated onto the permeable material 102 and integrated particulate material melts or softens the permeable material 102 so that the permeable material becomes bonded or fused with the particulate material. In an embodiment of the invention, the permeable material may have a coating of hot melt adhesive or similar material such as poly (ethylene-vinyl acetate) which becomes activated during heating.

The bonding mechanism described above is intended to be exemplary and not limiting. Other bonding mechanisms or types of bonding may be used. For example, the adsorbent particulates may be blended with heat-softenable polymer particles that become softened by the heating so that it softens to fuse with or even coat at least portions of the permeable material causing the adsorbent particulates to adhere to the permeable material. The permeable material 102, thus treated, can be wound into a roll 126 and stored or introduced directly into other converting operations to make desired products.

FIG. 2 shows detail (not necessarily to scale) of the fluidizer/coating chamber 104 (in FIG. 1). The permeable material 102 enters the fluidizer/coater chamber 104 through a slot 132. A slotted box top baffle 134 supports and locates an interchangeable fluidizer screen 114 by way of a retaining bracket 136. Exemplary fluidizer screens may be sintered metal screens having micron-sized opening. For example, useful fluidizer screens include 5, 10 and 20 micron (μm) pore size sintered metal screens available from Memtec American Corporation of Deland, Fla. Gas emerging from ring compressor 106 (FIG. 1) enters the fluidizer/coater chamber 104 through a hose 138 via inlet 110. The gas passes through the flow straightener 112 which may be, for example, a plastic honeycomb or similar flow straightener which could be selected by one of ordinary skill in the art. For example, an experimental setup used a flow straightener which was selected for the dimensions of the fluidizer/coater chamber 104 measured about 17 inches by 5 inches by about 1 inch in thickness with parallel honeycomb flow-straightening cells of about 3/16 inches in diameter. Gas leaving the flow straightener 112 passes through the fluidizer screen 114 levitating the solid particulate material to be adhered onto the permeable material (which may be electrically charged). Agglomeration of the solid particulate material may be prevented by adding microscopic bronze beads (not shown) from TSI Corporation, St. Paul, Minn., to the powder, the beads serving to keep any clumps of particulate material broken up. Levitated (e.g., fluidized) particulate material is put into the proximity of or contacted with the permeable material 102 and may become physically entrapped or integrated within the matrix of fibrous material that makes up the permeable material 102.

Gas and stray particulate material flows through permeable material 102 up through a port 140 and a hose 142 in the general direction of the arrows associated therewith and on toward the cyclone filter 120 (FIG. 1) to be recirculated.

The permeable material 102 and the integrated or entrapped particulate material proceeds out of the fluidizer/coater chamber 104 through a slot 144 and over a roller 146 on its way to the eccentric rollers 116 (FIG. 1) and to the heater 124 (FIG. 1).

Other methods or processes may be used to make the adsorbent filter for removing caffeine from liquids. Generally speaking coform techniques may be used to provide a matrix of fibrous material having adsorbent particulate material integrated within the matrix of fibrous material. Exemplary coform processes include, for example, those disclosed by U.S. Pat. No. 4,100,324 to Anderson et al. and U.S. Pat. No. 5,350,624 to Georger et al., the contents of which are incorporated herein by reference. U.S. Pat. Nos. 4,100,324 and 5,350,624 are assigned to the assignee of the present invention.

Although the inventors should not be held to a particular theory of operation, it is generally thought that the matrix of fibrous material (e.g., the coform webs) that contains the integrated adsorbent particulates should contain about 40 percent, by weight, or more of hydrophilic fibrous material such as, for example, cellulosic fibrous material (e.g., pulp, reconstituted cellulose fibers, surfactant treated fibers and the like). The remaining fibrous material may be hydrophobic fibrous material. For example, the proportion of hydrophilic fibrous material may be 50 percent, by weight, or more. As another example, the proportion of hydrophilic fibrous material may be 60 percent, by weight, or more.

The hydrophilic fibrous material may be hydrophilically transmuted hydrophobic fibers. Such hydrophilic transmuting may be carried out by wetting agents such as, for example, internal wetting agents and external wetting agents. An example, food grade surfactants may be applied to hydrophobic fibrous material such as, for example, polyolefin fibers to render them hydrophilic.

Generally speaking, the presence of hydrophilic fibers enhances liquid take-up into the filter as well as the relatively uniform passage of liquid through the filter. This is important because filters having poor liquid take-up and/or liquid pass-through generally require pressure differentials to drive the liquid through the filter rendering such filters impractical for convenient consumer application.

In an embodiment of the present invention, it is contemplated that coform structures having a gradient distribution such as those disclosed by U.S. Pat. No. 5,350,624, previously incorporated by reference, may have advantage in the practice of the present invention. Instead of a homogenous coform composite material, U.S. Pat. No. 5,350,624 discloses a matrix of meltblown fibers having a first exterior surface, a second exterior surface, and an interior portion. At least one other material is integrated into the meltblown fiber matrix so that the concentration of meltblown fibers adjacent each exterior surface is greater than the concentration of meltblown fibers in the interior portion.

Accordingly, it is contemplated that adsorbent particulate material may be introduced into a coform composite material (e.g., a matrix of meltblown fibers and pulp) such that the adsorbent particulate material is concentrated in the interior portion of the fibrous coform structure and the meltblown fibers and pulp are concentrated adjacent each exterior surface of the structure.

Figure 3:
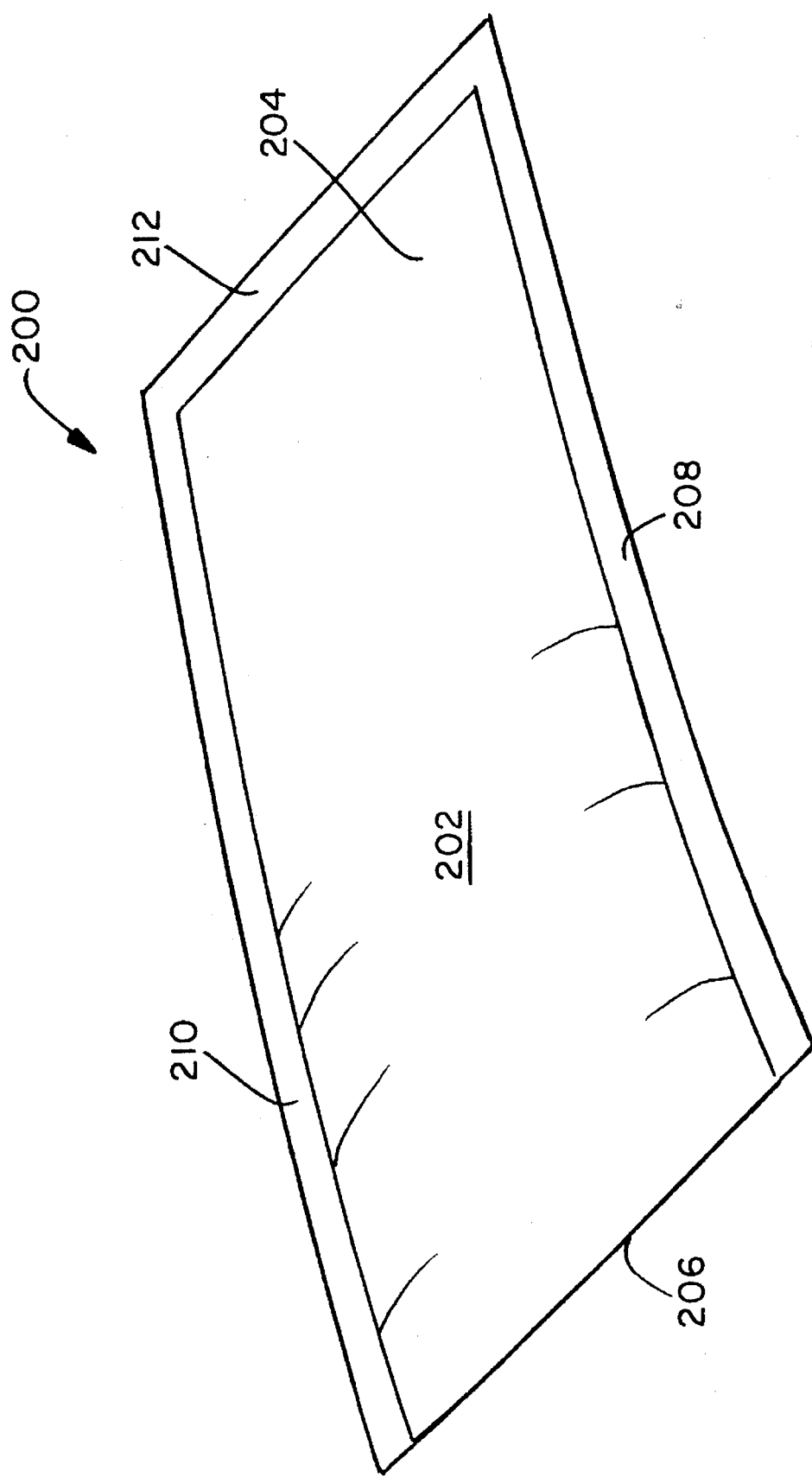
FIG. 3 is a representation of an exemplary adsorbent filter structure.

Other techniques may be used to keep the adsorbent particulate material in the filter. For example, in another embodiment of the present invention, the adsorbent filter for removing caffeine from liquids may be composed of: 1) a first layer and a second layer of a liquid permeable nonwoven fibrous material adapted to autogenously bond to itself upon application of heat; and 2) from about 10 to about 90 percent, by weight, of an adsorbent particulate material sandwiched between said first and second layers of liquid permeable nonwoven fibrous material, the adsorbent particulate material being selected from clays and zeolites. Such an exemplary adsorbent filter structure is illustrated in FIG. 3 at 200. The adsorbent filter 202 is composed of a strip of liquid permeable nonwoven fibrous material 204 adapted to autogenously bond to itself upon application of heat which has a folded end 206. When folded in half, the strip of liquid permeable material 204 forms a first layer and a second layer of liquid permeable material joined by the folded end 206. Extending from the folded end 206 is a first seam 208 and a second seam 210. At the portion of the adsorbent filter 202 opposite the folded end 206 is an end seam 212. Adsorbent material (e.g., clays and/or zeolites) sandwiched between the folded strips of liquid permeable nonwoven fibrous material is secured by the seams. Thermal bonds may be distributed at discrete locations over the entire filter to join the first and second layers of liquid permeable material. The presence of the thermal bonds may help keep the adsorbent material from shifting between the layers of liquid permeable material.

Generally speaking, the adsorbent materials may be present in any of the filter structures described above (i.e., integrated in the fibrous matrix or sandwiched between layers of a liquid permeable material) at a proportion of up from about 10 to about 90 percent, by weight. For example, the absorbent materials may be present in the filter at a proportion of about 30 to about 60 percent, by weight.

EXAMPLES

Preparation of Filter Systems

Several methods of containing a caffeine-selective adsorbent within a filter matrix were assessed and are described in the subsequent examples. These included a simple "sandwich" of the bentonite clay between heat-sealable paper, a nonwoven web containing bentonite clay particles integrated into the web (i.e., matrix of fibrous material), a coform web containing integrated bentonite particles, and a paper cake forming a matrix of pulp fibers entrapping and holding the adsorbent material.

Assay Method for Caffeine Detection in Water
(Ultraviolet/Visible Spectrophotometry)

An assay method using ultraviolet/visible (UV/Vis) spectrophotometry was used to screen the effectiveness of a filter or material for removing caffeine ($C_8H_{10}N_4O_2$) from aqueous caffeine solutions. The screening method consisted of analyzing the aqueous caffeine solutions both before treatment and after treatment or filtration. UV/Vis analysis was done using a Varian 2200 at 272 nm wavelength. The concentration of each sample was determined from a Beer's Law plot which had been generated from a series of aqueous caffeine standards. The percent caffeine removal was calculated using Equation (1):

Percent Caffeine Removal = $[1 - (C_8H_{10}N_4O_2\ _{SAMPLE}/C_8H_{10}N_4O_2\ _{CONTROL})] \times 100$     Eq. (1)

A typical analysis was as follows: A 0.12 g portion of the adsorbent material was weighed into a 25-mL glass vial, followed by 10.0 mL of a 0.5 mg/mL caffeine solution preheated to 75° C. The mixture was shaken for a specified period of time (standard time=2 minutes), and then filtered through a 0.45-micron syringe filter prior to UV/Vis analysis. Also, a portion of the untreated 75° C. caffeine solution was removed and filtered to serve as the control. The samples and control were analyzed by UV/Vis spectroscopy at a wavelength of 272 nm. It was often necessary to dilute the samples 1:10 by volume with distilled water (for samples having an absorbance >2.5). The concentration of each sample was calculated from a Beer's Law plot generated from aqueous caffeine standards.

Assay Method for Caffeine Detection in Brewed
Coffee High-Pressure Liquid Chromatography
(HPLC)

The UV/Vis assay could not be used for actual coffee samples due to interference from other UV/Vis-absorbers; thus, a method using HPLC was developed in order to analyze coffee samples. The samples were diluted to 10 percent strength using distilled water, and filtered through a 0.45-micron syringe filter prior to analysis by HPLC. The conditions were as follows:

Column: 6-micron YMC-Pack Polymer C-18 (4.6 mm diameter×150 mm length)

Detector: UV at 274 nm

Mobile Phase: water/methanol/acetonitrile (90/7/3 by volume)

Flow Rate: 1.5 mL/minute

Injection Volume: 25 uL

Under these conditions, the caffeine eluted at 9.5 minutes. A calibration curve was generated using caffeine solution standards; the concentration of a sample was calculated from this curve. The percent caffeine removal was calculated using Equation (1). A comparison of the UV/Vis assay to HPLC analysis showed that similar results were obtained from the two different methods. For example, aqueous caffeine solutions (sample and control) analyzed by UV/Vis showed 100 and 500 ppm caffeine respectively for 80 percent caffeine removal, while the same set analyzed by HPLC showed 110 and 510 ppm caffeine respectively for 78 percent caffeine removal.

Teabag-type Designs Containing Bentonite

Several teabag-type designs were prepared and used to remove caffeine from individual cups of brewed coffee (or other caffeine-containing beverages). It was found that designs using the most filterable (either low-swelling or flocculated) forms of bentonite and which provided higher surface areas were more efficient in removing caffeine. In the experiments conducted, higher surface area was obtained by simply dividing the bentonite into 5–6 individual teabags rather than one large teabag. After 5 minutes contact time, such a teabag design provided 25 percent decaffeination using calcium bentonite (4.9 g/cup level; see Example #7).

Example #1—Caffeine Removal Effectiveness

Several materials were tested with aqueous caffeine solutions using a UV assay method for their effectiveness in removing caffeine. The results (see Table I) show that, of the materials tested, the bentonite clays and the zeolite gave the best removal of caffeine.

TABLE I

Caffeine Removal by Various Materials in Aqueous Caffeine Solutions

| Material | g/cup level* | Exposure Time | % Caffeine Removal |
|---|---|---|---|
| Sodium bentonite: Volclay 2501 NF-BC, food-grade | 1.7 | 10 min | 92% |
| Calcium bentonite: | | | |
| Pelbon ® #3002[a] | 1 | 0.5 min | 71% |
| " | 1 | 2 min | 80% |
| " | 2 | 2 min | 94% |
| Hectalite, 4–8 mesh[a] | 2 | 1 min | 88% |
| " | 2 | 2 min | 90% |
| Hectalite, 40–60 mesh[a] | 2 | 1 min | 92% |
| " | 2 | 2 min | 93% |
| Hectalite, 14–30 mesh**,[a] | 2 | 2 min | 60% |
| Camargo White[a] | 2 | 1 min | 68% |
| " | 2 | 2 min | 70% |
| Pre-Flocculated bentonite***: | | | |
| H⁺/4% gelatin | 1 | 0.5 min | 75% |
| " | 1 | 2 min | 83% |
| " | 2 | 2 min | 80% |
| H⁺/4% gelatin (oven-dried) | 2 | 2 min | 40% |

TABLE I-continued

Caffeine Removal by Various Materials in Aqueous Caffeine Solutions

| Material | g/cup level* | Exposure Time | % Caffeine Removal |
|---|---|---|---|
| 20% gelatin | 2 | 2 min | 53% |
| " | 2 | 60 min | 73% |
| Acid-treated | 1 | 2 min | 77% |
| Zeolite MHS2-173[b] | 1.7 | 10 min | 84% |
| Activated Carbon[c] Calgon F816, 8 × 16 mesh | 2 | 2 min | 55% |
| Celite diatomaceous earth[d] | 2 | 2 min | 0% |
| Fuller's Earth | 2 | 2 min | 20% |
| Ion-Exchange Resin, Sulfonated[e] | | | |
| Bio-Rad AG50W X8 at 25° C. P1686-25 | 5.1 | 10 min | 90% |
| Bio-Rad AG50W X8 at 75° C. | 4.7 | 10 min | 62% |
| Polyacrylic acid, 3% XL Highly-crosslinked Dowlite[f] | 1.7 | 10 min | 30% |

*g/cup = grams of material per 170 mL (cup) of caffeine solution
**This Hectalite was a lower-swelling variety; used for the coform material
***Pre-flocculated samples were freeze-dried unless otherwise indicated
[a]available from American Colloid
[b]available from UOP
[c]available from Calgon Carbon
[d]available from Johns-Manville
[e]available from Bio-Rad Laboratories
[f]available from Dow Chemical Company

Example #2—Caffeine Capacity of Bentonite/Effect of Temperature and Exposure Time Portions of a 0.5 mg/mL aqueous caffeine solution were heated to either 55° C. or 75° C., or kept at room temperature. Sodium bentonite (Volclay NF-BC from American Colloid, Arlington Heights, Ill.) was weighed into 25-mL vials in various amounts, and then 10.0 mL of caffeine solution at the temperature to be tested was pipetted into the vial. The vial was constantly mixed using a wrist shaker (highest setting) for either 2 minutes or 10 minutes. After the time period had elapsed, the mixture of bentonite/caffeine solution was immediately filtered through a 0.45-micron syringe filter for caffeine analysis by UV/Vis.

Caffeine analysis showed there was little difference in the amount of caffeine removed between the two exposure times. In addition, the temperature of the caffeine solution did not appear to have an effect on the decaffeination efficiency of the bentonite clays. Levels ranging from 0.1 g/cup (bentonite per 170 mL of aqueous caffeine solution) to 5 g/cup were tested. Table II shows a summary of the results.

TABLE II

Caffeine Capacity of Bentonite as a Function of Temperature

| Ratio of Bentonite to Caffeine Solution (grams/cup) | Temp (°C.) | Exposure Time (min) | % Removal |
|---|---|---|---|
| 0.1 g/cup | 75 | 2 | 15% |
| 0.1 g/cup | 75 | 10 | 17% |
| 0.5 g/cup | 75 | 2 | 53% |
| 0.5 g/cup | 75 | 10 | 55% |
| 1.0 g/cup | 75 | 2–3 | 82% |
| 2.0 g/cup | 75 | 2–3 | 95% |
| 5.0 g/cup | 75 | 2–4 | 99% |
| 0.1 g/cup | 55 | 2 | 11% |
| 0.1 g/cup | 55 | 10 | 18% |
| 0.5 g/cup | 55 | 2 | 56% |
| 0.5 g/cup | 55 | 10 | 59% |
| 1.0 g/cup | 55 | 2–3 | 85% |
| 2.0 g/cup | 55 | 2–3 | 96% |

TABLE II-continued

Caffeine Capacity of Bentonite as a Function of Temperature

| Ratio of Bentonite to Caffeine Solution (grams/cup) | Temp (°C.) | Exposure Time (min) | % Removal |
|---|---|---|---|
| 5.0 g/cup | 55 | 2–4 | 98% |
| 1.7 g/cup | 25 | 2 | 92% |
| 8.5 g/cup | 25 | 45–60 | 99% |

Example #3—Taste Test of Bentonite-Treated Coffee

The coffee was prepared in a 2-burner, Bunn Pour-Omatic® drip coffee machine using 50 g Maxwell House® regular coffee grinds with 1650 g tap water. After brewing, the regular coffee was split into two separate portions, one to serve as the control and the other to be treated with 200-mesh, sodium bentonite Volclay NF-BC.

A 350-mL aliquot of the coffee to be treated was swirled with 14.6 g bentonite (7.1 g/cup level) for one minute, centrifuged for 2 minutes, and then filtered through glass fiber filters to remove the bentonite. The centrifugation and filtration took 8–10 minutes. This sample became the "bentonite-treated sample"; subsequent HPLC analysis found this sample had 98 percent less caffeine than the control "regular coffee". In addition, commercial decaffeinated coffee was prepared using 50 g Maxwell House® decaffeinated coffee grinds with 1650 g tap water.

All three samples (the regular, bentonite-treated, and commercial decaffeinated) were reheated using a microwave oven to ca. 40° C. The samples were poured into small paper cups labelled with code letters, as follows:

H=regular coffee (control)

M=bentonite-treated coffee

R=commercial decaffeinated coffee

The code letters allowed a blind taste test to be done.

Four individuals were given a cup of each sample—H, M and R—and asked to rate them either a 2 for most preferred, a 1 for next preferred, and a 0 for least preferred sample. Also, comments were requested for observations of any of the samples. The results of this taste test are summarized in Table III.

TABLE III

Results from Taste Test of Bentonite-treated Coffee

| Code | Sample | Average score* | Tasters' Comments |
|---|---|---|---|
| M | Bentonite-treated | 1.5 | 1) Least amount of smell but better tasting than 'R'; slight chalky taste; darker color<br>2) Mellow, slight aftertaste<br>3) A little burnt-kind of taste, but not bitter; darker<br>4) Gritty |
| H | Regular coffee | 1.25 | 1) Good smell, good taste<br>2) Slight acrid note, impression of strength<br>3) Bitter bite |
| R | Commercial decaffeinated | 0.25 | 1) Slight bitter taste; good smell, though<br>2) Flat, astringent, unbalanced<br>3) Understated, not bitter, almost almondy; more bitter than 'M' |

*The average score was obtained from the sum of the scores assigned to a particular sample divided by the number of scores for that sample.

Example #4—Acid-treated Bentonite

A 1 g portion of sodium bentonite (200 mesh, Volclay NF-BC, from American Colloid) was mixed with 10 g concentrated phosphoric acid. The resulting mixture was filtered onto a glass fiber filter using a Buchner funnel. The filtered solid was rinsed with several portions (totalling 20 mL) of distilled water, and dried in a vacuum oven (42° C., house vacuum). The acid-treated bentonite filtered much more easily and cleanly than the initial sodium form. That is, liquid passed through the filter more easily and fewer bentonite particles were found in the filtrate. The UV/Vis assay method determined that this material, tested in a 1 g/cup level, could remove 77 percent caffeine from an aqueous solution within two minutes (see Table I).

Example #5—Bentonite-Containing Filter

Part A—Preparation of Bentonite/20% Gelatin Mixture

A flocculated form of sodium bentonite was prepared as follows: A 400-mL aliquot of distilled water was heated to ca. 50° C. A mixture of 4.9 g sodium bentonite (Volclay NF-BC from American Colloid) and 0.5 g gelatin (Type A from porcine skin, 300 bloom, #G-2500 from Sigma Chemical Co.) was added to the water while stirring constantly using a magnetic stirbar. An additional 0.5 g gelatin was added to cause the bentonite mixture to flocculate into larger aggregates. Some water was removed by filtering onto a coarse glass fritted disk, and the remaining mixture was freeze-dried.

Part B—Preparation of the Filter

Two 4"-diameter circles were cut from a roll of heat-sealable paper (teabag paper, grade BHS 533—available from Kimberly-Clark Corporation, Roswell, Ga.). A bond pattern was formed into the circles using a Carver laboratory melt press (120° C., 5000 pounds pressure, for 1–5 seconds). A 1.5 g portion of the bentonite/20 percent gelatin mixture (actually containing 1.2 g bentonite; see Part A) was placed onto one circle which had its heat-sealable side facing up. The other circle was placed, adhesive side down, on top of the bentonite and circle. The edges of this "sandwich" disk were heat-sealed using an electric iron to fully encase the bentonite into a filter pack.

Part C—Evaluation of the Filter

The filter was placed in a 4"-diameter Buchner funnel. The funnel had ca. 80 percent of its holes blocked with Parafilm® laboratory film to reduce the flow rate and increase contact time of the bentonite with the caffeine solution. A 0.5 mg/mL caffeine solution was heated to 75° C., and 43 mL of this solution was poured onto the filter (i.e. 4.9 g/cup level). All of the solution had flowed through the filter using only gravity in 30–40 seconds. A 3-mL portion of the filtrate was filtered through a 0.45-micron syringe filter, and analyzed by UV/Vis. Also, a portion of the original caffeine solution, untreated, was analyzed as a control. Analysis showed that the filter provided 47 percent decaffeination in this relatively short time period. Generally speaking, the flocculated bentonite filter allowed liquid to pass through quickly with little or no particulates ending up in the filtrate.

Example #6—Bentonite/Coform Filter in a Drip Coffee Maker

Part A—Preparation of Bentonite/Coform Filters

Coform pulp/meltblown polypropylene (PP) batts containing bentonite clay were prepared generally in accordance with U.S. Pat. No. 4,100,324 to Anderson et al. A Christy dry material dispensing machine (available from the Christy Machine Company of Fremont, Ohio) dispensed a calcium bentonite (Hectalite GM grade, 14–30 mesh—available from American Colloid Company) into a pulp/polypropylene coform as the web was formed. Two different batts were prepared:

| Code # | Total Basis Weight (gsm) | % Bentonite | Pulp/PP Ratio |
| --- | --- | --- | --- |
| 1 | 310 | 65% | 60/40 |
| 2 | 245 | 69% | 40/60 |

The batts were prepared using the conditions specified in Table IV.

TABLE IV

Conditions Used To Prepare Bentonite/Coform Material

| | Code 1 | | Code 2 | |
| --- | --- | --- | --- | --- |
| | Extr #1 | Extr #2 | Extr #1 | Extr #2 |
| PP Pump Rate | 1.25 PIH | 1.25 PIH | 1.25 PIH | 1.25 PIH |
| Zone 1 Temp | 300° F. | 300° F. | 300° F. | 300° F. |
| Zone 2 Temp | 370° F. | 370° F. | 370° F. | 370° F |
| Zone 3 Temp | 420° F. | 420° F. | 420° F. | 420° F. |
| Zone 4 Temp | 380° F. | 380° F. | 380° F. | 380° F. |
| Zone 5 Temp | 480° F. | 480° F. | 480° F. | 480° F. |
| Zone 6 Temp | 480° F. | 480° F. | 480° F. | 480° F. |
| Extruder Melt Temp | — | — | 495° F. | 496° F. |
| Hose Temp | 500° F. | 500° F. | 500° F. | 500° F. |
| Adapter Temp | 480° F. | 480° F. | 480° F. | 480° F. |
| Extruder Pressure | 310 | 300 | 310 | 300 |
| Spin Pump Body Temp | 480° F. | 480 ° F. | 480° F. | 480° F. |
| Spin Pump Pressure | 76 | 95 | 76 | 95 |
| Spin Pump rpm | 5.0 | 5.0 | 5.0 | 5.0 |
| Adapter Pressure | 300 | 300 | 300 | 300 |
| Die Zone 1 | 510° F. | 510° F. | 500° F. | 500° F. |
| Die Zone 2 | 510° F. | 510° F. | 500° F. | 500° F. |
| Die Zone 3 | 510° F. | 510° F. | 500° F. | 500° F. |
| Die Zone 4 | 510° F. | 510° F. | 500° F. | 500° F. |
| Die Tip Melt Temp | 520° F. | 520° F. | 478° F. | 478° F. |
| Primary Air Pressure | 1 psi | 1 psi | 1 psi | 1 psi |
| Primary Air Temp | 495° F. | 495° F. | 480° F. | 480° F. |
| Prim Air Htr 20" line | 680° F. | 680° F. | 680° F. | 680° F. |
| Primary Air Flow/2 | 212 | | 76 | |
| CET Feed rpm | 4.2 | | 2.2 | |
| Line Speed fpm | 56 | | 56 | |
| Die Angles | 40° | 40° | 45° | 35° |
| Tip to Tip Distance | 6" | | | |
| Tip to Wire Distance | 5¾" | 6" | 10½" | 10¾" |
| CET Duct to Wire Dist | 5" | | 9½" | |
| Under Wire Zone 1 | −3 | | −3 | |
| Under Wire Zone 2 | −3 | | −3 | |
| Under Wire Zone 3 | −17 | | −17 | |
| Under Wire Zone 4 | −25 | | −25 | |
| Under Wire Zone 5 | −3 | | −3 | |
| Under Wire Zone 6 | −3 | | −3 | |
| Polymer Type | PF015 | | PF015 | |
| Pulp Type | NF 405 Wey | | NF 405 Wey | |
| Picker Air | 18" Water | | 18" Water | |

Part B—Evaluation of the Filters

The filters were tested using a Mr. Coffee (Model SRX20) drip brewer. The webs contained no surfactant, but were found to be wettable during a brewing cycle. The brewer was first rinsed by doing two brew cycles using 0.5 mg/mL aqueous caffeine solution rather than water; no coffee grounds were used. Three 3.5-inch diameter disks were cut from Code 2 bentonite/coform webs, containing a total of 3.0 g bentonite. These disks were placed into the basket portion of the brewer with a regular paper coffee filter beneath them. The brewing cycle was then initiated by pouring 170 mL of 0.5 mg/mL aqueous caffeine solution into the brewer (for a 3 g bentonite per cup level). The solution was collected for caffeine analysis as it came out of the brewer. A control was prepared by rinsing the basket, placing an unused paper coffee filter into it (without the bentonite disks), and conducting another brew cycle using 170 mL aqueous caffeine solution. UV analysis found that these filters had removed 4 percent of the caffeine.

This relatively low caffeine removal rate appears to be caused by dehydration of the bentonite by the high temperatures encountered during the coform process. Dehydrated bentonite appears to be less effective at removing caffeine than bentonite in hydrated form. Coform filters containing "dehydrated" bentonite were soaked in aqueous caffeine solution for several hours with constant shaking and were found to remove caffeine to the full limit of bentonite's caffeine removal capacity. It is thought that dehydration of the bentonite may be addressed by modifying the coform process so that the bentonite is metered into the process separately from the pulp and/or by introducing the coform/bentonite filters into an environment where the bentonite may be rehydrated prior to use.

Also, it should be noted that the bentonite used in this example was a low-swelling calcium bentonite material (Hectalite 14–30 mesh) which appears to decaffeinate less efficiently than other forms of Hectalite that were tested. Another factor that may have affected the caffeine removal rate is the apparent interference in the mass transfer rate that may be caused by the cellulose component of the coform batt. It appears that aqueous liquid tended to channel through the hydrophilic cellulose portions of the coform batt, and therefore reduces contact between the liquid and the bentonite. Application of a surfactant might help reduce this phenomenon.

Example #7—Bentonite Contained in a Teabag Matrix

Small teabags were formed by cutting 2"×1" pieces from Grade BHS 533 heat-sealable teabag paper (available from Kimberly-Clark Corporation, Roswell, Ga.), folding these in half to 1"×1" squares (adhesive side in), filling each with 1 g calcium bentonite (Pelbon® 3002), and sealing the edges. Five of these teabags (containing a total of 4.9 g bentonite) were tied together with nylon fishing line, and suspended over a 250-mL beaker containing 170 mL of 0.5 mg/mL aqueous caffeine solution heated to 75° C. with constant stirring. The teabags, tested at a level of 4.9 g bentonite per cup, were then lowered until fully immersed in the solution. Samples were withdrawn after 2 and 5 minutes exposure. UV analysis found that 17 percent and 25 percent, respectively, of the caffeine had been removed after these exposure times.

Free Swell Determination

Experiments showed that clays with higher free swell values (such as the sodium form) tended to clog the filter, required high pressure differentials, and did not filter cleanly (particles passed through the filter and ended up in the filtrate). Clays which did not swell much, such as the calcium or acid form of bentonite, tended to filter more easily and cleanly. Thus, a procedure for free swell determination, obtained from the American Colloid Company, was performed on various clay samples to evaluate them for filterability:

1. Weigh 1.0 gram of bentonite in "as received" condition.
2. Fill a 100-mL graduated cylinder to the 100-mL line with distilled water.
3. Add a portion of bentonite a bit at a time to the top surface.
4. Wait until all of this portion has wetted and fallen, then repeat step 3 until all bentonite is wetted and swollen. Note: Portions are normally 50–100 mg each, and addition rate is normally 6–10 minutes per portion.
5. Read the apparent volume of fully swelled bentonite at the end of 24 hours. Multiply this number by 2 to obtain the free swell value in mL/g.

The sodium bentonite is reported to have a free swell of approximately 35 mL/g, while the calcium bentonite samples which were tested ranged from 4–10 mL/g (see Table V).

TABLE V

Free Swell Values of Various Bentonite Samples

| Bentonite | Form | Free Swell (mL/g) |
|---|---|---|
| Pelbon ® 3002 | Calcium | 4 |
| Camargo White | Calcium | 6 |
| Hectalite 40–60 mesh | Calcium | 10 |
| Hectalite 14–30 mesh* | Calcium, low-swelling | 5 |
| Volclay | Sodium | 35 (reported value) |

*Used in Example #6

Experimentation demonstrated that an important factor in making suitable filters was the type of bentonite used. The high-swelling sodium bentonite (e.g. Volclay NF-BC from American Colloid) was found to be very difficult to remove using filtration; it required high pressures or strong vacuum in order to filter a slurry containing the sodium bentonite. Also, the sodium bentonite seemed to fracture or break apart in water, which caused some of the particles to pass through the filter and into the filtrate.

Treating the bentonite with gelatin, acid, or calcium was effective in converting the bentonite into a more filterable material. The gelatin was used to act as a flocculant with the bentonite particles. The resulting bentonite/gelatin aggregates were large enough to filter off easily and cleanly (i.e. filtered by gravity alone, and no measurable particles came through the filter). It required 10–20 wt % gelatin to flocculate the bentonite into large aggregates; however, only 4 percent gelatin was required if the bentonite had been pre-treated with acid. Other methods, such as treating the bentonite with acid or calcium, changed the bentonite into a less swellable form. Since a commercial source of the calcium bentonite was found, this form became the most practical one to use in filtration devices.

Disclosure of the presently preferred embodiments and examples of the invention are intended to illustrate and not to limit the invention. It is understood that those of skill in the art should be capable of making numerous modifications without departing from the true spirit and scope of the invention.

What is claimed is:

1. A caffeine adsorbent liquid filter comprising:
   a matrix of fibrous material, the matrix of fibrous material selected from woven fabrics, knit fabrics and nonwoven fabrics; and
   adsorbent particulate material integrated within the matrix of fibrous material,
   wherein passage of an aqueous liquid having a caffeine concentration ranging from about 20 to about 100 mg per 100 mL of liquid through the matrix for a contact time of less than about 2 minutes results in at least a 40 percent reduction in the caffeine concentration of the liquid.

2. The adsorbent filter of claim 1, wherein the filter is adapted to provide at least a 40 percent reduction in the caffeine concentration for about 1 cup to about 40 cups of the liquid.

3. The adsorbent filter of claim 1, wherein the filter is adapted to provide at least a 40 percent reduction in the caffeine concentration for about 1 cup to about 20 cups of the liquid.

4. The adsorbent filter of claim 1, wherein the filter is adapted to provide at least a 40 percent reduction in the caffeine concentration for about 1 cup to about 12 cups of the liquid.

5. The adsorbent filter of claim 1, wherein the liquid is selected from coffee, tea, and cola.

6. The adsorbent filter of claim 1, wherein the nonwoven fabric is a nonwoven web selected from meltblown fibrous webs, continuous spunbonded filament webs, bonded carded fibrous webs, and wet-laid fibrous webs.

7. The adsorbent filter of claim 6, wherein the nonwoven web includes fibers selected from synthetic fibers, natural fibers and pulp.

8. The adsorbent filter of claim 1, wherein the adsorbent material is selected from smectite clay minerals.

9. The adsorbent filter of claim 8, wherein the smectite clay minerals are selected from montmorillonite clays and bentonite clays.

10. The adsorbent filter of claim 9, wherein the bentonite clays are selected from sodium bentonite clays, calcium bentonite clays, acidified bentonite clays, and modified bentonite clays containing a flocculating agent.

11. The adsorbent filter of claim 1, wherein the filter contains from about 10 to about 90 percent, by weight, adsorbent material.

12. The adsorbent filter of claim 11, wherein the filter contains from about 20 to about 70 percent, by weight, adsorbent material.

13. The adsorbent filter of claim 12, wherein the filter contains from about 30 to about 60 percent, by weight, adsorbent material.

14. A caffeine adsorbent liquid filter comprising:
   a matrix of fibrous material; and
   adsorbent clay minerals integrated within the matrix of fibrous material,
   wherein passage of from about 1 cup to about 12 cups of an aqueous liquid having a caffeine concentration ranging from about 20 to about 100 mg per 100 mL of liquid through the matrix for a contact time of less than about 2 minutes results in at least a 40 percent reduction in the caffeine concentration of the liquid.

15. The adsorbent filter of claim 14, wherein the clay minerals are selected from sodium bentonite clays, calcium bentonite clays, acidified bentonite clays, and modified bentonite clays containing a flocculating agent.

16. The adsorbent filter of claim 14, wherein the filter contains from about 10 to about 90 percent, by weight, adsorbent material.

17. The adsorbent filter of claim 14, wherein the matrix of fibrous material is a nonwoven web selected from meltblown fibrous webs, continuous spunbonded filament webs, bonded carded fibrous webs, and wet-laid fibrous webs.

18. A caffeine adsorbent liquid filter comprising:
- a matrix of fibrous material selected from meltblown fibrous webs, continuous spunbonded filament webs, bonded carded fibrous webs, wet-laid fibrous webs, and wet-laid fibrous cakes; and
- from about 10 to about 90 percent, by weight, of adsorbent clay minerals integrated within the matrix of fibrous material
- wherein passage of from about 1 cup to about 40 cups of an aqueous liquid having a caffeine concentration ranging from about 20 to about 100 mg per 100 mL of liquid through the matrix for a contact time of less than about 2 minutes results in at least a 40 percent reduction in the caffeine concentration of the liquid.

19. A caffeine adsorbent liquid filter comprising:
- a first layer and a second layer of a liquid permeable nonwoven fibrous material adapted to autogenously bond to itself upon application of heat; and
- from about 10 to about 90 percent, by weight, of an adsorbent particulate material sandwiched between said first and second layers of liquid permeable nonwoven fibrous material,
- wherein passage of from about 1 cup to about 40 cups of an aqueous liquid having a caffeine concentration ranging from about 20 to about 100 mg per 100 mL of liquid through the filter for a contact time of less than about 2 minutes results in at least a 40 percent reduction in the caffeine concentration of the liquid.

20. The adsorbent filter of claim 19, wherein the adsorbent material is selected from smectite clay minerals.

21. The adsorbent filter of claim 20, wherein the smectite clay minerals are selected from montmorillonite clays and bentonite clays.

22. The adsorbent filter of claim 21, wherein the bentonite clays are selected from sodium bentonite clays, calcium bentonite clays, acidified bentonite clays, and modified bentonite clays containing a flocculating agent.

* * * * *